(No Model.)

C. H. OLSON.
SCREW DRIVER.

No. 306,096. Patented Oct. 7, 1884.

Witnesses
C. C. Clark
P. D. Walker

Inventor
CHRISTOPHER H. OLSON.
By L. P. Graham
atty.

UNITED STATES PATENT OFFICE.

CHRISTOPHER H. OLSON, OF DECATUR, ILLINOIS.

SCREW-DRIVER.

SPECIFICATION forming part of Letters Patent No. 306,096, dated October 7, 1884.

Application filed July 26, 1883. (No model.)

*To all whom it may concern:*

Be it known that I, CHRISTOPHER H. OLSON, a resident of the city of Decatur, county of Macon, and State of Illinois, have invented certain new and useful Improvements in Screw-Drivers, of which the following is a specification.

My invention relates to that class of screw-drivers in which intermittent rotary motion is produced by means of spiral grooves, and in which the handle has a longitudinal reciprocating motion on the shaft.

The object of my invention is to increase the power of such screw-drivers, to simplify the construction of the same, and to insure the exposure of a clean smooth surface at all stages of its operation.

My invention may be briefly described as an elongated shaft operating in a spirally-grooved longitudinally-reciprocating handle, said shaft being formed into or provided with a screw-driver at one end and provided on the opposite end with a revolving drive-block, which has a limited amount of free longitudinal motion on the shaft, and is provided with spiral projections on its circumference and radial recesses on its face, the whole being so adjusted that the projections of the drive-block will fit in the grooves of the handle, and when said handle is firmly held and forced in the direction of the point of the screw-driver the radial recesses of the revolving drive-block will engage projections on the shaft and cause the same to rotate.

Figure 1:
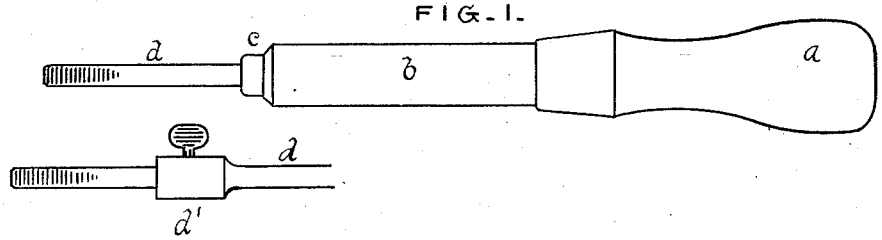
Figure 2:
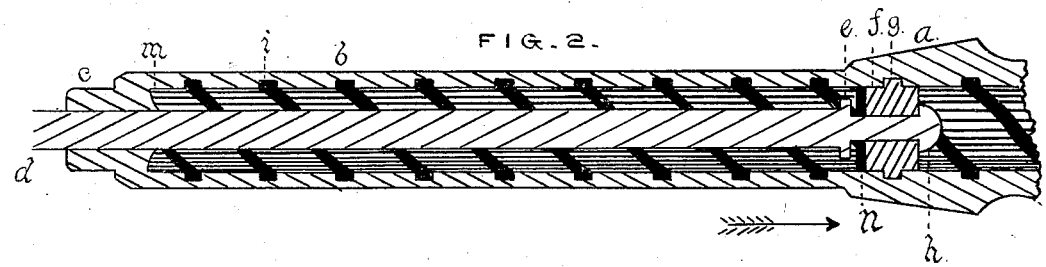
Figure 3:
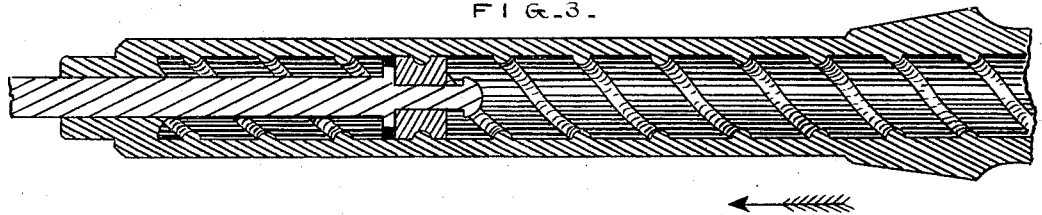
Figure 4:
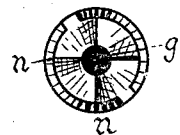

In the drawings accompanying and forming a part of this specification, Figure 1 is an outline drawing of my device, with a modification of the screw-driver point annexed. Fig. 2 is a longitudinal diametrical section of a portion of the shaft and handle, showing the position of the drive-block on the shaft while the handle is moving from the point of the screw-driver. Fig. 3 is represented with ribs in place of spiral grooves, and shows the position of the drive-block on the shaft when the pressure is against the end of the handle, and Fig. 4 is an end view of the drive-block.

$a$ is the handle proper, which fits over the spirally grooved or ribbed cylinder $b$.

$c$ is a bearing for the shaft, formed in the end of cylinder $b$.

$d$ is the shaft, provided with head $h$ and projections $e$.

$f$ is the drive-block, provided with spiral projections $g$ and radial recesses $n$.

$m$ is a concavity that retains the oil in the cylinder.

$a'$ shows a modification of the shaft, by means of which the screw-driver may be detached and a bit substituted therefor.

Spiral ribs are shown in Fig. 3 as a modification of the spiral grooves $i$ of Fig. 2, and these may be formed of wire and soldered in a smooth cylinder.

In operation, when the driver is placed against a screw and pressure is brought to bear on the end of the handle, projections $e$ of the shaft are forced into radial recesses $n$ of the drive-block, and if the handle is firmly held and the pressure thereon continued, both drive-block and shaft will rotate under the influence of the spirals $i$ as the handle moves longitudinally. When the motion of the handle is reversed, the drive-block is drawn from contact with the projections on the shaft and permitted to revolve, while the shaft remains stationary.

I am aware that screw-drivers have been used in which the shaft was provided with spiral grooves and operated by a longitudinally-reciprocating handle; but in such cases the power is applied too near the longitudinal center of the shaft to produce much effect, and as the grooves must be constantly oiled and are nearly always exposed, uncleanliness is necessarily involved in their operation.

I claim—

1. In a screw-driver, the combination, with an internally-screw-threaded barrel, of a longitudinally-moving shank or blade, a rotating nut or externally-threaded sleeve surrounding the said shank or blade, and means for automatically connecting the said sleeve and shank or blade, substantially as and for the purpose specified.

2. In a screw-driver, the combination, with an internally - screw - threaded barrel, of a smooth shaft or shank adapted to be moved longitudinally therein, and provided with spurs or projections, and an adjustable block or nut having a limited amount of longitudinal movement thereon, said nut or block being externally threaded to correspond with the internally-threaded barrel, and provided with recesses for engaging the projections on the shaft or shank, substantially as described.

3. The combination, in a screw-driver in which intermittent rotary motion in one direction is produced in the driver by means of reciprocating motion in the handle, of a cylindrical handle, $b$, provided with a series of helical grooves, $i$, a smooth shaft, $d$, provided with radial projections $e$, and a rotating block, $f$, having a limited amount of longitudinal motion on the shaft, and provided with helical projections $g$ and radial recesses $n$, as and for the purposes set forth.

4. In a screw-driver provided with a reciprocating handle and a rotating shaft, the combination, with said handle $b$ and shaft $d$, of bearing $c$ and oil-receptacle $m$, as and for the purpose set forth.

CHRISTOPHER H. OLSON.

Witnesses:
I. D. WALKER,
L. P. GRAHAM.